United States Patent
Kogetsu et al.

(10) Patent No.: US 7,767,341 B2
(45) Date of Patent: Aug. 3, 2010

(54) NEGATIVE ELECTRODE FOR LITHIUM ION SECONDARY BATTERY AND METHOD FOR PRODUCING THE NEGATIVE ELECTRODE

(75) Inventors: Yasutaka Kogetsu, Osaka (JP); Kazuyoshi Honda, Osaka (JP); Yuuko Ogawa, Osaka (JP)

(73) Assignee: Panasonic Corporation, Osaka (JP)

( * ) Notice: Subject to any disclaimer, the term of this patent is extended or adjusted under 35 U.S.C. 154(b) by 1076 days.

(21) Appl. No.: 11/473,149

(22) Filed: Jun. 23, 2006

(65) Prior Publication Data

US 2006/0292445 A1 Dec. 28, 2006

(30) Foreign Application Priority Data

Jun. 24, 2005 (JP) ............................. 2005-184300

(51) Int. Cl.
*H01M 4/58* (2010.01)
*C01B 21/068* (2006.01)
*C01B 21/06* (2006.01)

(52) U.S. Cl. ..................... 429/218.1; 423/344; 423/406

(58) Field of Classification Search .................. None
See application file for complete search history.

(56) References Cited

U.S. PATENT DOCUMENTS

2004/0248011 A1* 12/2004 Asao et al. ............. 429/231.95

FOREIGN PATENT DOCUMENTS

| JP | 2002-083594 | 3/2002 |
|----|-------------|--------|
| JP | 2002-356314 | 12/2002 |

* cited by examiner

*Primary Examiner*—Dah-Wei D Yuan
*Assistant Examiner*—Katherine Turner
(74) *Attorney, Agent, or Firm*—McDermott Will & Emery LLP

(57) ABSTRACT

A negative electrode for a lithium ion secondary battery including a current collector and an active material layer carried on the current collector, wherein the active material layer includes an active material and no binder, the active material contains silicon and nitrogen, and the active material layer has a larger nitrogen ratio on a side of a first face which is in contact with the current collector than on a side of a second face which is not in contact with the current collector.

9 Claims, 4 Drawing Sheets

NEGATIVE ELECTRODE FOR LITHIUM ION SECONDARY BATTERY AND METHOD FOR PRODUCING THE NEGATIVE ELECTRODE

FIELD OF THE INVENTION

The present invention relates to a lithium ion secondary battery, and more particularly to a negative electrode therefor and a method for producing the negative electrode.

BACKGROUND OF THE INVENTION

Lithium ion secondary batteries are being widely employed as a power source for driving electronic equipment. Negative electrodes for lithium ion secondary batteries whose active material is a graphite material have an average potential during the desorption of lithium ions of about 0.2 V (vs. Li/Li$^+$) and exhibit a relatively flat potential. This potential is lower than that of the negative electrodes comprising hard carbon (non-graphitizable carbon). Therefore, equipment that requires high voltage and voltage flatness currently employs, as the power source, lithium ion secondary batteries comprising a negative electrode including a graphite material. Graphite materials, however, have a small capacity per unit weight of 372 mAh/g, and a further increase in capacity cannot be expected.

Meanwhile, materials capable of forming an alloy or compound with lithium are considered promising as the negative electrode materials which provide a high capacity. Such materials include silicon, tin, silicon oxide and tin oxide. During the absorption of lithium ions, however, the crystal structure of these materials changes so that the volume of the materials increases. For example, the composition of silicon in the state where the maximum amount of lithium ions are absorbed is represented by Li$_{4.4}$Si. The volume of Li$_{4.4}$Si equals 4.12 times the volume of Si. As for graphite in the state where the maximum amount of lithium ions are absorbed, its volume equals 1.2 times the volume of graphite containing no lithium.

A large volume change in negative electrode active material results in cracking of active material particles, insufficient contact between the active material and the current collector, etc. As a result, charge/discharge cycle life of the lithium ion secondary battery shortens. Particularly when cracking of active material particles occurs, the surface area of the active material particles increases. This accelerates the reaction between the active material particles and a non-aqueous electrolyte. Consequently, a film is formed on the surface of the active material. The formation of such film increases the interface resistance, which is considered as a major cause for short charge/discharge cycle life.

Under the circumstances, attempts have been made to form an amorphous silicon thin-film on a current collector having a rough surface so as to ensure space for relieving the expansion stress of active material as well as to ensure current collecting efficiency (see, e.g., Japanese Laid-Open Patent Publication No. 2002-83594). In order to increase the adhesion strength between the copper current collector and the amorphous silicon thin-film, this publication proposes to subject the amorphous silicon thin-film having formed on the current collector to heat treatment. By the heat treatment, a composite layer of silicon and copper is formed. Attempts have also been made to use a mixture of partially nitrided silicon oxide and a carbon material as a negative electrode active material (Japanese Laid-Open Patent Publication No. 2002-356314).

The negative electrode disclosed by Japanese Laid-Open Patent Publication No. 2002-83594, however, has some problems. Because lithium ion conductivity in the silicon is low, polarization increases when charge/discharge is performed with a high current level, resulting in a low discharge capacity. Particularly when the thin film is composed only of silicon, a large concentration gradient of lithium is formed in the thickness direction, and the capacity tends to be low. Further, because silicon has an extremely large expansion coefficient, the resulting electrode is highly deformed. As a result, the electrode group in which the positive and negative electrodes are placed opposed to each other can be buckled, degrading the battery characteristics. Moreover, to relieve expansion stress at the interface between the silicon thin-film and the current collector, it is necessary to form silicon into a columnar shape, or to disperse copper in silicon by heat treatment, which requires enormous cost.

Likewise, the negative electrode disclosed by Japanese Laid-Open Patent Publication No. 2002-356314 also suffers from some problems. Because the partially nitrided silicon oxide particle has low electron conductivity, a conductive material (e.g., carbon) needs to be added to the active material. As a result, the negative electrode has a low capacity density, so that battery capacity as expected cannot be obtained. In other words, an advantage of high capacity offered by the use of silicon cannot be obtained. Moreover, if graphite is used as a conductive material and propylene carbonate as a non-aqueous solvent for electrolyte, propylene carbonate decomposes on the surface of graphite during charge.

BRIEF SUMMARY OF THE INVENTION

An object of the present invention is to provide a negative electrode capable of offering a high capacity lithium ion secondary battery having superior high rate charge/discharge characteristics and excellent cycle characteristics.

The present invention relates to a negative electrode for a lithium ion secondary battery comprising a current collector and an active material layer carried on the current collector, wherein the active material layer comprises an active material and no binder, the active material comprises silicon and nitrogen, and the active material layer has a larger nitrogen ratio on a side of a first face which is in contact with the current collector than on a side of a second face which is not in contact with the current collector.

As used herein, the "nitrogen ratio" means a ratio of the number of nitrogen atoms to the number of silicon atoms. When the active material is expressed by SiN$_x$, the value of x represents the nitrogen ratio.

Preferably, the nitrogen ratio increases continuously, or tends to increase continuously on average, from the second face to the first face.

Preferably, a region having a thickness of T/10 from the second face, where T represents a thickness of the active material layer, has a composition represented by SiN$_x$ where $0 \leq x \leq 0.2$.

Preferably, a region having a thickness of T/10 from the first face, where T represents a thickness of the active material layer, has a composition represented by SiN$_x$ where $0.2 < x \leq 1$.

The active material layer preferably has a thickness T of 0.5 to 30 μm.

The present invention further relates to a method for producing a negative electrode for a lithium ion secondary battery comprising the steps of: (i) setting a deposition zone for depositing an active material on a long-length current collector in a nitrogen-containing reduced pressure atmosphere; (ii)

producing silicon atoms in the nitrogen-containing reduced pressure atmosphere by sputtering or vaporization; (iii) continuously conveying or feeding the current collector in the longitudinal direction such that the current collector passes through the deposition zone from the inlet to the outlet of the deposition zone; and (iv) depositing the silicon atoms produced in the nitrogen-containing reduced pressure atmosphere on the current collector while the current collector passes through the deposition zone, wherein the nitrogen concentration of the nitrogen-containing reduced pressure atmosphere is controlled to be higher at the inlet side than at the outlet side of the deposition zone.

In this method, the nitrogen concentration in the nitrogen-containing reduced pressure atmosphere is preferably decreased continuously from the inlet side to the outlet side of the deposition zone.

The nitrogen-containing reduced pressure atmosphere preferably contains at least one selected from the group consisting of ammonia, nitrogen plasma, and nitrogen radical.

The present invention further relates to a method for producing a negative electrode for a lithium ion secondary battery comprising the steps of: (i) setting a deposition zone for depositing an active material on a long-length current collector in a reduced pressure atmosphere; (ii) producing silicon atoms and nitrogen atoms in the reduced pressure atmosphere by sputtering or vaporizing a silicon simple substance target and a silicon nitride target; (iii) continuously conveying or feeding the current collector in the longitudinal direction such that the current collector passes through the deposition zone from the inlet to the outlet of the deposition zone; and (iv) depositing the silicon atoms and nitrogen atoms produced in the reduced pressure atmosphere on the current collector while the current collector passes through the deposition zone, wherein the silicon simple substance target is arranged at the outlet side of the deposition zone, and the silicon nitride target is arranged at the inlet side of the deposition zone.

The present invention still further relates to a lithium ion secondary battery comprising a positive electrode, the above-described negative electrode and an electrolyte interposed between the positive electrode and the negative electrode.

The present invention provides a negative electrode with improved lithium ion conductivity, and thus provides a lithium ion secondary battery having excellent high rate charge/discharge characteristics. Furthermore, the present invention prevents stress that occurs at the interface between the negative electrode active material layer and the current collector due to expansion and contraction of the active material, and thus provides a lithium ion secondary battery having excellent cycle characteristics.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
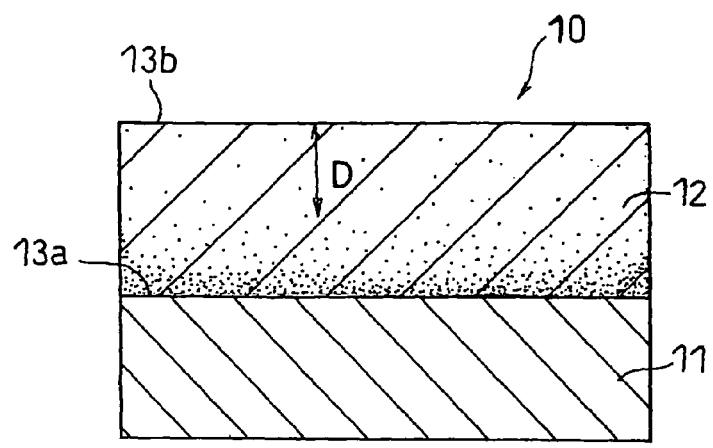
FIG. 1 is a schematic vertical sectional view of a negative electrode according to one embodiment of the present invention.

A negative electrode of the present invention has a structure as shown in FIG. 1. A negative electrode 10 comprises a current collector 11 and an active material layer 12 carried on the current collector 11. The active material layer 12 comprises an active material and no binder. The active material layer 12 containing no binder can be formed on the current collector by depositing an active material in a vacuum atmosphere or reduced pressure atmosphere by means of vapor deposition, sputtering, chemical vapor deposition (CVD), etc.

The active material comprises silicon and nitrogen. The active material may comprise a mixture of a silicon simple substance and a silicon nitride, or a silicon nitride alone. The silicon simple substance and the silicon nitride each function as an active material. The active material layer may further comprise an element other than silicon and nitrogen such as oxygen. In this case, however, the molar ratio of silicon atoms (Si) and nitrogen atoms (N) contained in the entire active material layer is preferably Si:N=1:0.05 to Si:N=1:1. The amount of other element such as oxygen is not specifically limited.

The current collector 11 may be made of, but not limited to, copper, nickel, stainless steel or the like. The surface of the current collector 11 may be roughened because, by roughening the surface of the current collector, the adhesion strength between the active material layer and the current collector can be improved.

As shown in FIG. 1, the active material layer 12 has a first face 13a which is in contact with the current collector 11 and a second face 13b which is not in contact with the current collector 11. The active material layer 12 has a larger nitrogen ratio (i.e. a larger value of x when the active material is represented by $SiN_x$) on the side of the first face 13a than on the side of the second face 13b. Specifically, as the depth D from the second face 13b to the first face 13a increases (i.e., as it gets further away from the second face 13b), the nitrogen ratio becomes higher. By changing the nitrogen ratio in the thickness direction of the active material layer as just described, it is possible to produce a higher capacity battery having more excellent balance between high rate charge/discharge characteristics and cycle characteristics than one whose active material layer has a uniform nitrogen ratio.

In the active material represented by $SiN_x$, its capacity increases as the nitrogen ratio (i.e., the value of x) decreases, but the lithium ion conductivity decreases and the expansion coefficient of the active material due to reaction with lithium increases. Conversely, as the value of x increases, the lithium ion conductivity increases and the expansion coefficient of the active material due to reaction with lithium decreases, but the capacity of the active material decreases. Accordingly, a region of the active material layer 12 having a large nitrogen ratio has higher lithium ion conductivity. In other words, as it gets further away from the second face 13b, the lithium ion conductivity of the active material increases. Even when the active material layer contains oxygen, the lithium ion conductivity increases, as is the case for the active material layer containing nitrogen.

Changing the nitrogen ratio in the thickness direction of the active material layer 12 as described above allows lithium ions to diffuse easily in the active material layer 12 from the second face 13b to the first face 13a. As a result, the lithium concentration becomes almost constant throughout the entire active material layer 12. Because the lithium concentration gradient decreases in the thickness direction of the active material layer, the charge/discharge reactions proceed more uniformly in the entire active material layer even during high rate charge/discharge. Accordingly, favorable high rate charge/discharge characteristics can be obtained. Moreover, even if the active material expands during charge, stress is not concentrated in spots of the active material layer.

The reason why the lithium ion conductivity increases in the region having a large nitrogen ratio has not been well understood. It is, however, surmised that some of nitrogen atoms react with absorbed lithium in the silicon nitride, thereby producing lithium nitride, and thus improving lithium ion conductivity. Because lithium nitride has high electron conductivity, the electrode resistance is also assumed to be small. Furthermore, because the electron conductivity and lithium ion conductivity of the silicon nitride are improved, the reaction between the silicon nitride and lithium ions is assumed to be accelerated during charge.

Moreover, because the nitrogen ratio is increased from the second face 13b to the first face 13a of the active material layer 12, the active material which is present near the first face 13a has a low expansion coefficient during charge. In other words, the active material becomes rigid. When the expansion coefficient during charge decreases, the stress that occurs between the current collector and the active material is small. Accordingly, the separation of the active material from the current collector can be prevented, improving current collecting efficiency. This also improves cycle characteristics of the battery.

In the active material layer, the nitrogen ratio is preferably increased continuously from the second face which is not in contact with the current collector to the first face which is in contact with the current collector. This further improves the effects described above.

Preferably, the active material in a region having a thickness of T/10 from the second face, where T represents a thickness of the active material layer, is represented by $SiN_{xa}$ ($0 \leq xa \leq 0.2$), and more preferably $SiN_{xa}$ ($0.05 \leq xa \leq 0.2$). Even when the nitrogen ratio xa is small at the second face side (i.e., near the surface) of the active material layer, it does not affect high rate charge/discharge characteristics because the distance of diffusing path of lithium ions is short at the surface side. When the nitrogen ratio xa is greater than 0.2, the advantage of high capacity offered by the use of silicon cannot be exploited.

Furthermore, the active material in a region having a thickness of T/10 from the first face, where T represents a thickness of the active material layer, is preferably represented by $SiN_{xb}$ ($0.2 < xb \leq 1$), and more preferably $SiN_{xb}$ ($0.2 < xb \leq 0.7$). When the nitrogen ratio xb is not greater than 0.2, the lithium ion conductivity of the active material layer decreases, degrading high rate charge/discharge characteristics. In addition, the stress at the interface between the active material layer and the current collector increases. When xb is larger than 1 ($1 < xb$), the advantage of high capacity offered by the use of silicon cannot be exploited.

When xa satisfies $0 \leq xa \leq 0.2$ and xb satisfies $0.2 < xb \leq 1$, the ratio of xb to xa (xb/xa) is preferably 2 to 10. By satisfying $2 \leq xb/xa \leq 10$, a battery having excellent balance of high rate charge/discharge characteristics and cycle characteristics can be obtained. If xb/xa is less than 2, because the difference of nitrogen ratio between the first face side and the second face side of the active material layer is small, a battery which is excellent in both high rate charge/discharge characteristics and cycle characteristics may be difficult to obtain. If xb/xa is greater than 10, because the difference of expansion coefficient between the first face side and the second face side of the active material layer is large, distortion is likely to occur in the active material layer.

The active material layer preferably has a thickness T of 0.5 to 30 µm, and more preferably 5 to 25 µm. If the thickness of the active material layer is less than 0.5 µm, sufficient battery capacity cannot be obtained. If the thickness of the active material layer is grater than 30 µm, electric resistance in the thickness direction of the active material layer increases, which may degrade high rate charge/discharge characteristics.

The silicon and silicon nitride contained in the active material layer are preferably amorphous. Because crystalline active materials have lower ion conductivity than amorphous active materials, the use of crystalline active material reduces the improvement of high rate charge/discharge characteristics. Moreover, crystalline active materials are easily broken due to expansion, and therefore the use thereof reduces the improvement of cycle characteristics. Preferably, the silicon and the silicon nitride exhibit no peak or a broad peak with a half width of not less than 0.5° at 2θ=10° to 40° in an X-ray diffraction pattern using CuKα radiation as a light source.

A description is now given of a method for producing a negative electrode for a lithium ion secondary battery of the present invention. It should be understood, however, that the production method is not limited thereto.

According to a first embodiment method, (i) a deposition zone for depositing an active material on a long-length current collector is first set or defined in a nitrogen-containing reduced pressure atmosphere. The nitrogen-containing reduced pressure atmosphere can be obtained by introducing ammonia, nitrogen plasma, or nitrogen radical, into a reduced pressure atmosphere or vacuum atmosphere. Then, (ii) silicon atoms are produced in the nitrogen-containing reduced pressure atmosphere by sputtering or vaporization, during which (iii) the current collector is continuously conveyed or fed in the longitudinal direction such that the current collector passes through the deposition zone from the inlet to the outlet of the deposition zone. And, (iv) the silicon atoms produced in the nitrogen-containing reduced pressure atmosphere are deposited on the current collector while the current collector passes through the deposition zone. In this method, the nitrogen concentration in the nitrogen-containing reduced pressure atmosphere is controlled to be higher at the inlet side than at the outlet side of the deposition zone. The nitrogen concentration in the nitrogen-containing reduced pressure atmosphere is preferably decreased continuously from the inlet side to the outlet side of the deposition zone. This yields an active material layer whose nitrogen ratio is larger on the side of the first face which is in contact with the current collector than on the side of the second face which is not in contact with the current collector.

Figure 2:
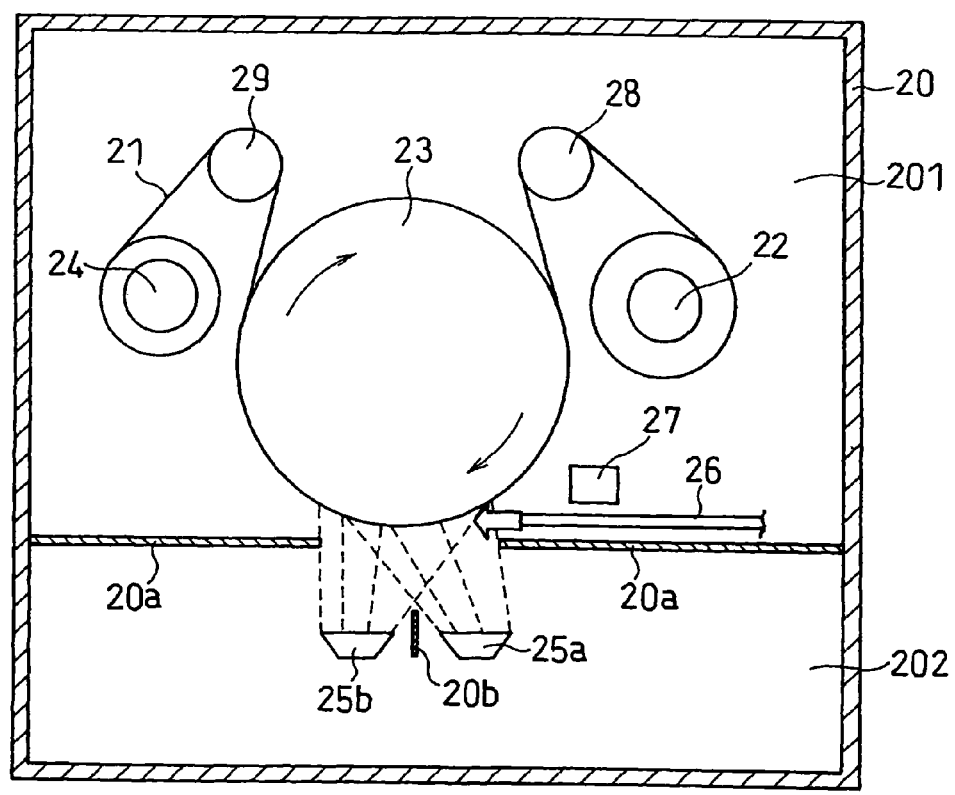
FIG. 2 is a schematic diagram showing the structure of a vapor deposition apparatus used for producing a negative electrode according to one embodiment of the present invention.

For producing silicon atoms in the nitrogen-containing reduced pressure atmosphere by vaporization, a vapor deposition apparatus as shown in FIG. 2 can be used.

The vapor deposition apparatus of FIG. 2 includes a vacuum chamber 20. The inside of the vacuum chamber 20 is divided by a shielding plate 20a into two spaces: an upper space 201 and a lower space 202. In the upper space 201 are disposed a feeding roller 22 for feeding a current collector 21, a can roller 23 for sending the current collector 21 fed from the feeding roller 22 to a deposition zone, and a winding roller 24 for winding the current collector 21 having an active material layer formed thereon sent from the can roller 23. The shielding plate 20a has an opening in the center thereof. Above the opening of the shielding plate 20a is located a deposition zone for forming the active material layer. This opening faces the surface of the can roller 23. In the lower space 202 below the opening are disposed two silicon targets 25a and 25b. Between the silicon targets 25a and 25b is arranged a shielding plate 20b. Each target releases silicon atoms when heated by an electron beam irradiation device (not shown in the drawing) or the like.

Near the inlet of the deposition zone is arranged a nozzle 26 for introducing a nitrogen atom-containing gas (e.g., ammonia gas or nitrogen gas) to the deposition zone. The nitrogen atom-containing gas is preferably released in the direction shown by the arrow in FIG. 2, that is, in a direction almost parallel to the moving direction of the current collector 21 that passes over the opening of the shielding plate 20a. The amount of gas released from the nozzle 26 is controlled such that the gas concentration gradually decreases along the moving direction of the current collector 21. Thereby, the concentration of nitrogen contained in the deposition zone becomes higher at the inlet side and lower at the outlet side of the deposition zone. A plasma generator 27 for converting the nitrogen atom-containing gas into a plasma may be arranged near the nozzle 26.

In the deposition apparatus of FIG. 2, the long-length current collector 21 fed from the feeding roller 22 is sent through a roller 28 to the surface of the can roller 23 rotated in a clockwise direction. The current collector 21 is then moved along the surface of the can roller 23 and passes over the opening of the shielding plate 20a (i.e., the deposition zone). During this, silicon atoms produced from the two silicon targets, along with nitrogen atoms in the nitrogen-containing gas supplied from the nozzle 26, are deposited on the current collector 21, forming an active material layer. The thickness of the active material layer can be changed by changing the moving speed of the current collector and the deposition rate (speed) of the silicon atoms during this process. The current collector 21 having the active material layer formed thereon is then moved through a roller 29 and wound by the winding roller 24. The distance between the inlet (i.e., the starting position of the active material layer formation) and the outlet (i.e., the ending position of the active material layer formation) of the deposition zone is determined appropriately according to the thickness of the active material layer, the moving speed of the current collector, the deposition rate of silicon atoms and nitrogen atoms, etc.

When the deposition zone has a higher nitrogen concentration at the inlet side thereof and a lower nitrogen concentration at the outlet side thereof, an active material having a high nitrogen content is formed at the inlet side of the deposition zone. While the current collector 21 passes through the deposition zone, the thickness of the active material layer increases gradually. At the outlet side of the deposition zone, an active material having a low nitrogen content is formed. The active material layer thus formed has a larger nitrogen ratio on the side of the first face in contact with the current collector than on the side of the second face not in contact with the current collector. Further, by continuously decreasing the nitrogen concentration from the inlet side to the outlet side of the deposition zone, the active material layer can be formed in which the nitrogen content is continuously increased from the second face to the first face.

In the case where an ammonia gas is used as the nitrogen atom-containing gas, the flow rate of the ammonia gas is determined according to the deposition rate of the silicon atoms, the capacity of the vacuum chamber, the suction capability of a pump used to suck the gas in the vacuum chamber, the speed at which the target(s) is vaporized, etc. When the vapor deposition apparatus has an electron beam irradiation device, if the pressure of ammonia in the vacuum chamber is high, the electron beam irradiation device might discharge abnormally. For this reason, the flow rate of the ammonia gas is preferably adjusted such that the pressure in the vacuum chamber is $5 \times 10^{-4}$ Torr or less.

As shown in FIG. 2, a plasma generator 27 may be placed near the nozzle 26 to convert the nitrogen into a plasma. In this case, a nitrogen gas is preferably used because nitrogen gas is less expensive and less corrosive than ammonia gas. By converting the nitrogen into a plasma, the reaction between silicon and nitrogen can be accelerated.

Examples of the plasma generator 27 include a high frequency generator, an ion gun, a radical gun, a plasma gun and an electron beam irradiation device.

High frequency generators generate a nitrogen plasma by using a certain member in the vacuum chamber as an electrode and applying a high frequency to the electrode. Because the excited nitrogen gas turns into ions or free radicals, its reactivity with silicon increases. A high frequency of 13.56 MHz is relatively easy to apply and effective in generating a plasma. It should be understood, however, that the high frequency that can be applied is not limited thereto. A microwave having a frequency of 100 kHz, 2.45 GHz, etc., is also effective in generating a plasma. It is also effective to use a tuning controller used for sputtering apparatus to convert the applied electric power into a plasma energy.

Ion radiation may be performed to convert the nitrogen into a plasma. In this case, a commercially available ion gun can be used as the ion source. The nitrogen gas may be introduced directly into the deposition zone (i.e., into the vacuum chamber), or it may be introduced into the ion gun. However, introducing the nitrogen atom-containing gas having high corrosivity directly into the ion gun (particularly, a hot-cathode type ion gun) significantly shortens the filament life. For this reason, the nitrogen atom-containing gas having high corrosivity is preferably introduced directly into the deposition zone.

The nitrogen gas may be converted into free radicals using a radical source. The use of ion source produces electrically charged species whereas the use of radical source produces uncharged radicals having extremely high chemical reactivity. Accordingly, the reactivity between silicon and nitrogen can be enhanced using a radical source. As the radical source, a commercially available radical gun can be used. An excitation frequency of 13.56 MHz or 2.45 GHz can be used.

A plasma generator can be a plasma gun. Inside the plasma gun, an argon plasma is generated by direct-current discharge utilizing thermionic emission from a tungsten filament. The electrons in the generated plasma are accelerated by an electric field produced by the electrodes, and irradiated to the deposition zone. As a result, the silicon atoms and the nitrogen gas are excited or ionized. The use of such plasma gun enables the reaction over a large area.

It is also effective to irradiate an electron beam to the silicon atoms and the nitrogen gas. By irradiating an electron beam to the silicon atoms and the nitrogen gas, they are converted into ions. Particularly when the silicon atoms and the nitrogen gas are highly concentrated, the collision frequency increases, rapidly increasing the plasma density. The electron beam accelerating voltage is, for example, −2 kV to −40 kV, and preferably −8 kV to −30 kV. If the absolute value of the accelerating voltage is too small, the effect of plasma generation is reduced. If the absolute value of the accelerating voltage is too large, plasma generation can be enhanced significantly, but this requires additional equipment for preventing electrical breakdown or abnormal discharge.

The method for obtaining nitrogen plasma or nitrogen radical is not limited to those described above. The advantageous effect of the present invention is not impaired even when other methods are used.

Figure 3:
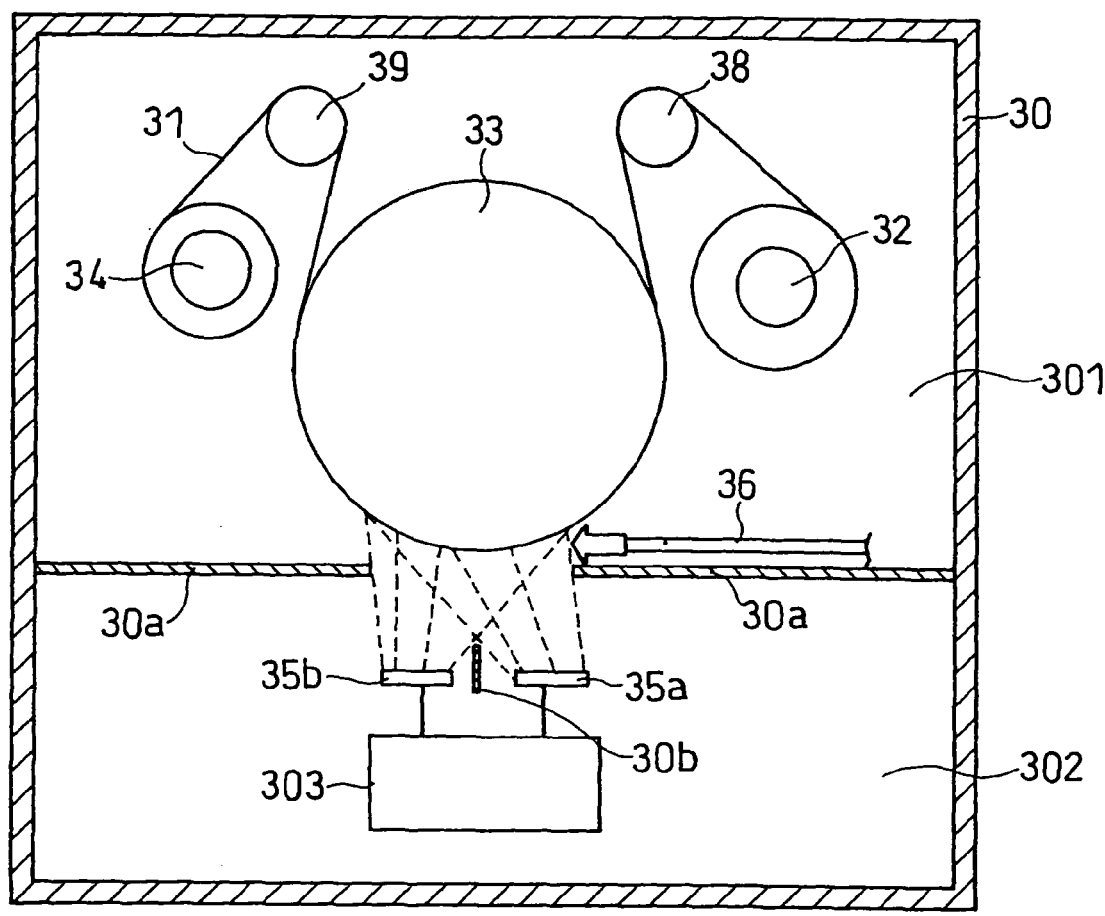
FIG. 3 is a schematic diagram showing the structure of a sputtering apparatus used for producing a negative electrode according to one embodiment of the present invention.

For producing silicon atoms in the nitrogen-containing reduced pressure atmosphere by sputtering, a sputtering apparatus as shown in FIG. 3 can be used.

The sputtering apparatus of FIG. 3 includes a vacuum chamber 30. The inside of the vacuum chamber 30 is divided by a shielding plate 30a into two spaces: an upper space 301 and a lower space 302. In the upper space 301 are disposed a feeding roller 32 for feeding a current collector 31, a can roller 33 for sending the current collector 31 fed from the feeding roller 32 to a deposition zone, and a winding roller 34 for winding the current collector 31 having an active material layer formed thereon sent from the can roller 33. The shielding plate 30a has an opening in the center thereof. Above the opening of the shielding plate 30a is located a deposition zone for forming an active material layer. This opening faces the surface of the can roller 33. In the lower space 302 below the opening are disposed two silicon targets 35a and 35b. Between the silicon targets 35a and 35b is arranged a shielding plate 30b. A sputtering gas such as argon is converted into a plasma by a high frequency power supplier 303, and each target releases silicon atoms.

Near the inlet of the deposition zone is arranged a nozzle 36 for introducing a nitrogen atom-containing gas (e.g., ammonia gas or nitrogen gas) to the deposition zone. The nitrogen atom-containing gas is preferably released in the direction shown by the arrow in FIG. 3, that is, in a direction parallel to the moving direction of the current collector 31 that passes over the opening of the shielding plate 30a. The amount of gas released from the nozzle 36 is controlled such that the gas concentration gradually decreases along the moving direction of the current collector 31. Thereby, the concentration of nitrogen contained in the deposition zone becomes higher at the inlet side and lower at the outlet side of the deposition zone.

The long-length current collector 31 fed from the feeding roller 32 is sent through a roller 38 to the surface of the can roller 33 rotated in a clockwise direction. The current collector 31 is then moved along the surface of the can roller 33 and passes over the opening of the shielding plate 30a (i.e., the deposition zone). During this, silicon atoms produced from the two silicon targets, along with nitrogen atoms in the nitrogen-containing gas supplied from the nozzle 36, are deposited on the current collector 31, forming an active material layer. The thickness of the active material layer can be changed by changing the moving speed of the current collector and the deposition rate (speed) of the silicon atoms during this process. The current collector 31 having the active material layer formed thereon is then moved through a roller 39 and wound by the winding roller 34.

In the sputtering apparatus of FIG. 3, while a sputtering gas (e.g., argon) is converted into a plasma by the high frequency power supplier 303, the introduced nitrogen atom-containing gas is also converted into a plasma. For this reason, unlike the vapor deposition apparatus of FIG. 2, a plasma generator for converting the nitrogen into a plasma (e.g., an electron beam irradiation device) is unnecessary.

Although the vapor deposition apparatus of FIG. 2 and the sputtering apparatus of FIG. 3 each have two targets, the number of target is not limited thereto. For example, they may have only one target. However, it is preferred to adjust the moving speed of the current collector, the flow rate of the nitrogen atom-containing gas, the energy applied to the target, etc, according to the number of target or the size thereof.

According to a second embodiment method, (i) a deposition zone for depositing an active material on a long-length current collector is first set or defined in a reduced pressure atmosphere. Then, (ii) silicon atoms and nitrogen atoms are produced in the reduced pressure atmosphere by sputtering or vaporizing a silicon simple substance target and a silicon nitride target, during which (iii) the current collector is conveyed or fed in the longitudinal direction such that the current collector passes through the deposition zone from the inlet to the outlet of the deposition zone. And, (iv) the silicon atoms and nitrogen atoms produced in the reduced pressure atmosphere are deposited on the current collector while the current collector passes through the deposition zone. In this embodiment method, the silicon simple substance target is arranged at the outlet side of the deposition zone, and the silicon nitride target is arranged at the inlet side of the deposition zone. This produces an active material layer having a high nitrogen content on the side of the first face which is in contact with the current collector than on the side of the second face which is not in contact with the current collector.

Also, in a second embodiment method, a vapor deposition apparatus as shown in FIG. 2 or a sputtering apparatus as shown in FIG. 3 can be used. In the case of a vapor deposition apparatus as shown in FIG. 2, for example, a silicon nitride can be used as the target 25a, and a silicon simple substance can be used as the target 25b. The targets 25a and 25b are vaporized simultaneously. Alternatively, in the case of a sputtering apparatus as shown in FIG. 3, a silicon nitride can be used as the target 35a, and a silicon simple substance can be used as the target 35b. The targets 35a and 35b are sputtered simultaneously. In either case, the concentration of nitrogen contained in the deposition zone is higher at the inlet side and lower at the outlet side of the deposition zone. As the current collector approaches the outlet of the deposition zone, the ratio of nitrogen atoms contained in the total of the silicon atoms and nitrogen atoms emitted from the targets decreases. Accordingly, at the inlet side of the deposition zone, an active material having a high nitrogen content is deposited on the current collector, and, at the outlet side, an active material having a low nitrogen content is deposited on the current collector. During this, by adjusting the area of the opening of the shielding plate 20a or 30a, the height and angle of the shielding plate 20b or 30b, or the energy for vaporizing each target, the active material layer having a desired distribution of nitrogen can be formed.

The current collector is not necessarily moved continuously. For example, while the current collector is held still, the partial pressure of the nitrogen atom-containing gas contained in the vacuum chamber is reduced gradually from the start of deposition of the active material, or the ionization rate of nitrogen atoms is reduced gradually, so as to form the active material layer. According to this method also, the nitrogen ratio can be varied in the thickness direction of the active material layer. Therefore, the negative electrode of the present invention can be obtained.

In both the first and second embodiment methods, silicon targets, which are an inexpensive material, can be used. Also, the active material layer can be formed in only one vacuum chamber. Accordingly, the negative electrode of the present invention can be produced efficiently and at low cost.

A lithium ion secondary battery of the present invention includes the negative electrode described above. There is no limitation in other components than the negative electrode, such as positive electrode and non-aqueous electrolyte. It should be noted, however, that the negative electrode of the present invention offers sufficient electron conductivity without graphite conductive material. For this reason, propylene carbonate can be used as a solvent for non-aqueous electrolyte. The use of propylene carbonate improves discharge capacity of the battery in a low temperature environment. The amount of propylene carbonate is preferably 10 to 70 volt of the entire solvent for non-aqueous electrolyte.

The present invention will be described below in further detail with reference to examples.

EXAMPLE 1

(Battery 1)

(i) Production of Positive Electrode

With 100 parts by weight of lithium cobalt oxide ($LiCoO_2$) having an average particle size of 5 μm was mixed 3 parts by weight of acetylene black as a conductive material to prepare a mixture. The obtained mixture was mixed with an N-methyl-2-pyrrolidone (NMP) solution of polyvinylidene fluoride (PVDF) as a binder to prepare a positive electrode material mixture paste. The amount of PVDF was 4 parts by weight per 100 parts by weight of lithium cobalt oxide. The resulting positive electrode material mixture paste was applied onto both surfaces of an aluminum foil current collector, followed by drying and rolling. Thereby, a positive electrode was produced.

(ii) Production of Negative Electrode

A negative electrode was produced using a vapor deposition apparatus (available from ULVAC, Inc.) as shown in FIG. 2. In this example, an electron beam irradiation device (not shown in the drawing) was used as a means for vaporizing the targets.

As the negative electrode current collector, an electrolytic copper foil (available from Furukawa Circuit Foil Co., Ltd.) having a width of 10 cm, a thickness of 35 μm and a length of 50 m was used. As targets 25a and 25b, silicon single crystals having a purity of 99.9999% (available from Shin-Etsu Chemical Co., Ltd.) were used.

As the nitrogen atom-containing gas, an ammonia gas having a purity of 99.999% (available from Nippon Sanso Corporation) was used. The ammonia gas was ejected from a nozzle 26 into a vacuum chamber 20 at a flow rate of 10 sccm (standard cc/min). The nozzle 26 was connected to a pipe inserted in the vacuum chamber 20 which was connected to a bomb filled with the ammonia gas through a mass flow controller.

A hooped copper foil current collector 21 was attached to a feeding roller 22. The current collector 21 was conveyed through a roller 28, a can roller 23 and another roller 29 to a winding roller 24 having an empty reel where the current collector 21 was wound. The current collector 21 was moved at a rate of 7 cm/min. The can roller 23 had a surface temperature of 20° C.

An electron beam was irradiated to the targets 25a and 25b each comprising a silicon single crystal so as to vaporize silicon and to allow vaporized silicon atoms to pass through the ammonia atmosphere, whereby the silicon atoms were deposited with nitrogen on one surface of the current collector, forming an active material layer. For the formation, the accelerating voltage of the electron beam was set at −8 kV. The emission of the electron beam was set at 300 mA.

In the same manner as above, an active material layer containing silicon and nitrogen was also formed on the other surface of the current collector. The active material layer formed on each surface of the current collector had a thickness of 7 μm.

Finally, the resulting electrode plate was cut into a predetermined size to produce a negative electrode.

Figure 5:
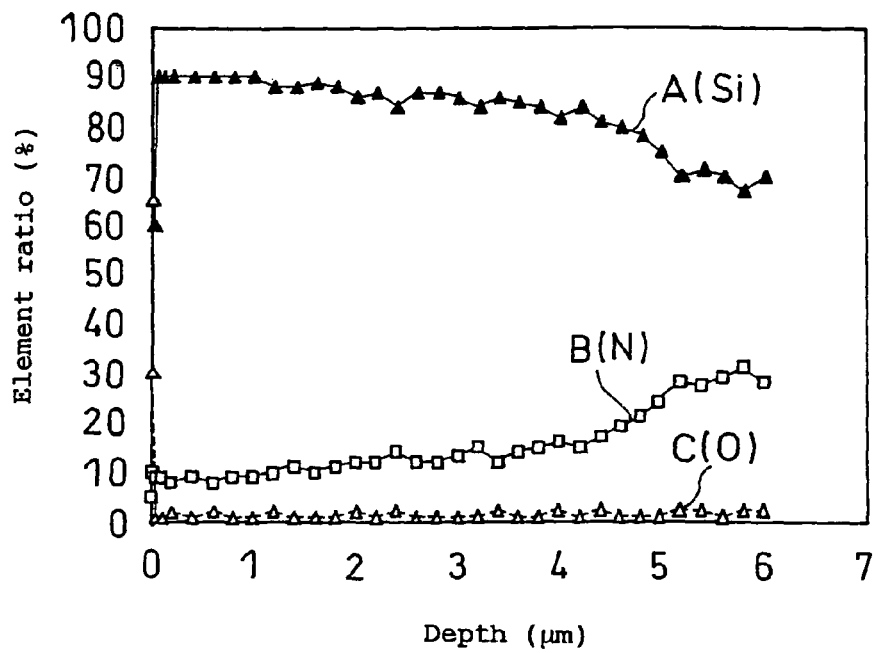
FIG. 5 is a graph of the depth from surface versus element ratio for the negative electrode produced in an EXAMPLE.

The produced negative electrode was analyzed by Auger electron spectroscopy (AES). The results are shown in FIG. 5. As can be seen from FIG. 5, as the depth increased from the surface (second face) of the active material layer (i.e., as it neared the current collector), the amount (atom %) of nitrogen increased (curve B) and the amount of silicon decreased (curve A). In FIG. 5, a depth of 0 μm corresponds to the second face of the active material layer not in contact with the current collector. In the second face at a depth of 0 μm, the amount of oxygen (curve C) was remarkably high. This is presumably because when the produced negative electrode plate was removed from the vacuum chamber, the active material reacted with oxygen in the air, forming an oxide film on the second face. As can be seen from FIG. 5, the nitrogen ratio was the lowest at a depth of 0 μm, and continuously increased until a depth of 6 μm.

Figure 6:
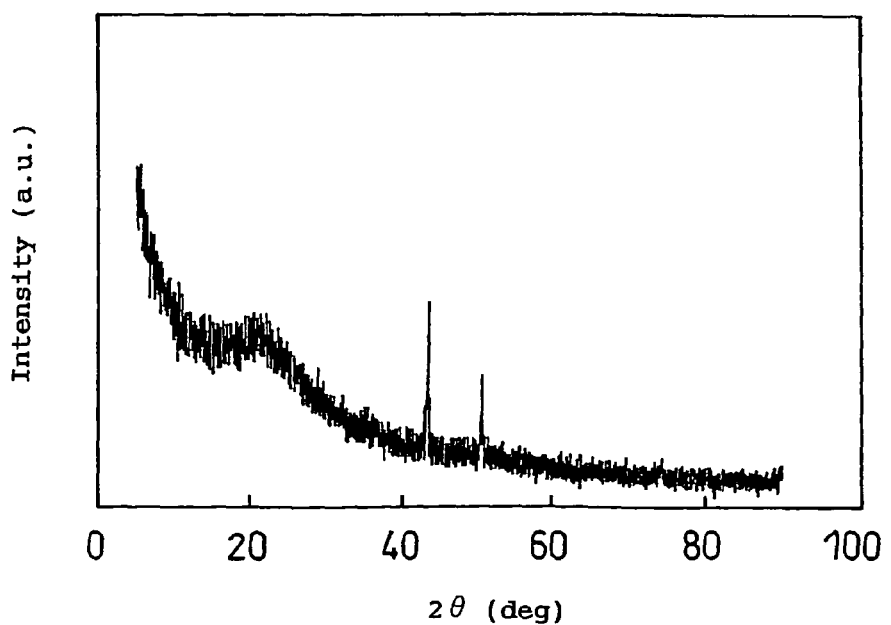
FIG. 6 is an X-ray diffraction pattern of the negative electrode produced in an EXAMPLE.

The obtained negative electrode was further analyzed by X-ray diffractometry (XRD) using CuKα radiation. The result is shown in FIG. 6. Only copper was detected from the X-ray diffraction pattern. The obtained pattern showed no peak at 2θ=10° to 35°, and therefore the active material composed of silicon and nitrogen were identified as amorphous.

As the foregoing shows, the active material of the negative electrode produced in this example was amorphous, and the nitrogen ratio of the active material was continuously increased from the surface of the active material layer toward the current collector.

(iii) Preparation of Non-aqueous Electrolyte

An electrolyte was prepared by dissolving $LiPF_6$ in a solvent mixture of ethylene carbonate (EC) and ethyl methyl carbonate (EMC) at a volume ratio of 1:3 at a $LiPF_6$ concentration of 1 mol/L.

(iv) Production of Battery

Figure 4:
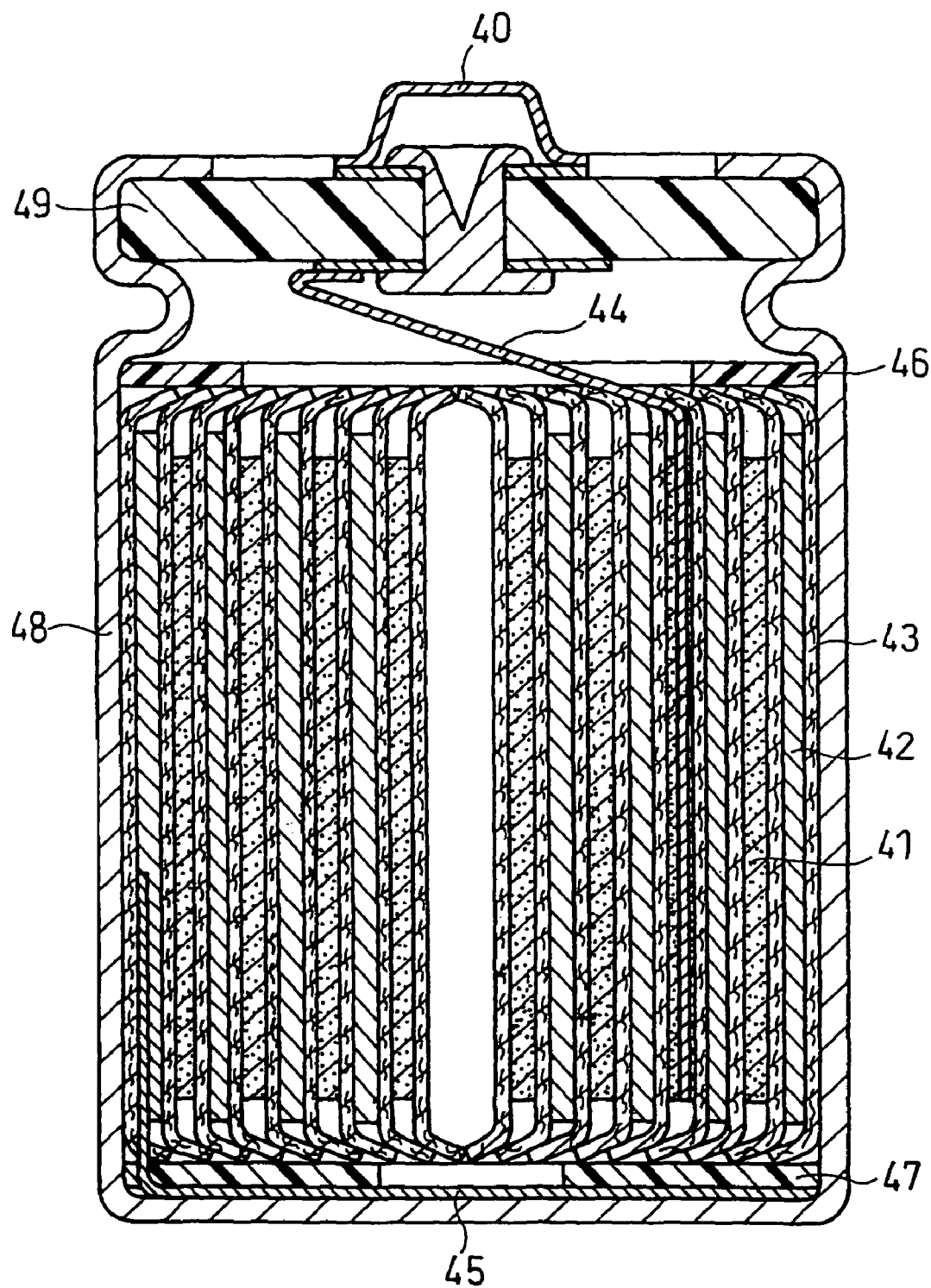
FIG. 4 is a schematic vertical sectional view of a cylindrical battery produced in EXAMPLEs.

A 17500-type cylindrical battery as shown in FIG. 4 was produced.

The positive electrode 41 and the negative electrode 42 were spirally wound with a separator 43 interposed therebetween to produce an electrode assembly. The electrode assembly was housed in an iron battery case 48 plated with nickel. The positive electrode 41 was connected to the underside of a resin sealing plate 49 through an aluminum positive electrode lead 44. The under side of the sealing plate 49 was electrically connected to a positive electrode terminal 40. Likewise, the negative electrode 42 was connected to the bottom of the battery case 48 through a nickel negative electrode lead 45. On the upper part of the electrode assembly was placed an upper insulating plate 46. On the lower part of the same was placed a lower insulating plate 47. Subsequently, a predetermined amount of the non-aqueous electrolyte was injected into the battery case 48. Finally, the opening of the battery case 48 was sealed with the sealing plate 49. Thereby, a battery was produced (hereinafter referred to as battery 1).

(Comparative Battery 1)

A comparative battery 1 was produced in the same manner as the battery 1 was produced except that, in the production of the negative electrode, ammonia was not injected into the vacuum chamber.

(Comparative Battery 2)

A negative electrode comprising a partially nitrided silicon powder was produced in the following procedure.

A silicon powder available from Kojundo Chemical Laboratory Co., Ltd. was placed in a ceramic tray, which was then introduced into a baking furnace and baked in flowing nitrogen gas at 1200° C. for three hours. The resulting mass was pulverized to yield a partially nitrided silicon having an average particle size of 5 µm. The thus prepared powder was analyzed for composition by fluorescent X-ray analysis and was found to have a composition of $SiN_{0.3}$.

The partially nitrided silicon powder was mixed with an artificial graphite having an average particle size of 5 µm (SFG5 available from TIMCAL, Ltd.) and PVDF serving as a binder at a weight ratio of 50:50:9. To the resulting mixture was further added NMP to prepare a negative electrode material mixture paste. The negative electrode material mixture paste was applied to both surfaces of a copper foil current collector, followed by drying. Thereby, active material layers each having a thickness of 20 µm were formed on both surfaces of the current collector. The resulting electrode plate was cut into a predetermined size to produce a negative electrode.

A comparative battery 2 was produced in the same manner as in EXAMPLE 1 except that the negative electrode produced above was used.

(Comparative Battery 3)

A comparative battery 3 was produced in the same manner as in EXAMPLE 1 except that the ammonia gas was supplied uniformly in the vicinity of the targets. The resulting active material layer had a constant nitrogen ratio of 0.3 in the thickness direction.

[Evaluation 1]

(Initial Discharge Capacity)

Each of the battery 1 and the comparative batteries 1 to 3 was charged at a constant current of 40 mA until the battery voltage reached 4.2 V at an ambient temperature of 25° C. After an interval of 20 minutes, the battery was then discharged at a current of 40 mA until the battery voltage decreased to 2.5 V. This charge/discharge cycle was repeated twice. The discharge capacity obtained at the second cycle (discharge capacity at 40 mA) was denoted as initial capacity.

(High Rate Capacity Ratio)

Each of the battery 1 and the comparative batteries 1 to 3 was charged at a constant current of 40 mA until the battery voltage reached 4.2 V at an ambient temperature of 25° C. After an interval of 20 minutes, the battery was then discharged at a current of 400 mA until the battery voltage decreased to 2.5 V, during which the discharge capacity at 400 mA was measured. The rate of the discharge capacity at 400 mA to the initial capacity (discharge capacity at 40 mA) expressed in percentage was denoted as high rate capacity ratio.

(Capacity Retention Rate)

Each of the battery 1 and the comparative batteries 1 to 3 was subjected to 100 charge/discharge cycles in each of which charge was performed at a constant current of 40 mA until the battery voltage reached 4.2 V at an ambient temperature of 25° C., after an interval of 20 minutes, discharge was then performed at a current of 40 mA until the battery voltage decreased to 2.5 V. The rate of the discharge capacity obtained at the 100th cycle to the initial capacity (discharge capacity at 40 mA) expressed in percentage was denoted as capacity retention rate. The results are shown in Table 1.

TABLE 1

|  | Initial capacity (mAh) | High rate capacity ratio (%) | Capacity retention rate at 100th cycle (%) |
| --- | --- | --- | --- |
| Battery 1 | 212 | 91 | 85 |
| Comp. Battery 1 | 223 | 60 | 55 |
| Comp. Battery 2 | 150 | 81 | 40 |
| Comp. Battery 3 | 210 | 70 | 59 |

As can be seen from Table 1, the battery 1 exhibited excellent performance in all evaluation items. As for the comparative battery 1, on the other hand, although it exhibited a relatively high initial capacity, its high rate capacity ratio and cycle characteristics were low. The reason why the battery 1 exhibited excellent high rate capacity ratio (i.e., high rate discharge characteristics) and superior capacity retention rate at the 100th cycle (i.e., cycle characteristics) is presumably because nitrogen-rich $SiN_x$ was formed at the interface between the active material layer and the current collector. Because the interface between the active material layer and the current collector had a small amount of silicon reactive with lithium, the expansion and contraction of the active material was small at the interface. For this reason, it is assumed that excellent contact condition was maintained at the interface.

The active material layer of the comparative battery 1, which was composed only of silicon, had a higher theoretical capacity than that of the battery 1. For this reason, the comparative battery 1 exhibited a slightly higher initial capacity than the battery 1. Silicon, however, has a large expansion coefficient when reacted with lithium. Thus, stress was easily applied to the interface between the active material layer and the current collector. Consequently, the active material layer partially separated from the current collector, increasing the interface resistance, resulting in poor high rate discharge characteristics. The low cycle characteristics was presumably due to the increase in interface resistance and the increase in polarization.

The comparative battery 2 exhibited excellent high rate discharge characteristics because it contained, in addition to the silicon nitride powder and the binder, artificial graphite as a conductive material. Its high rate capacity ratio, however, was slightly lower than that of the battery 1. Moreover, its initial capacity and capacity retention rate at the 100th cycle were extremely low. The poor capacity retention rate was presumably due to disruption of conductivity between the particles resulting from expansion and contraction of the silicon nitride particles.

The comparative battery 3 whose active material was composed of silicon nitride exhibited better high rate discharge characteristics and better cycle characteristics than the comparative battery 1 whose active material was composed only of silicon. The comparative battery 3 also exhibited a relatively good initial capacity, roughly the same level as that of the battery 1. Its high rate discharge characteristics and cycle characteristics, however, were much lower than those of the battery 1. The low level of high rate discharge characteristics were due to poor lithium ion conductivity of the silicon nitride. The reason why the cycle characteristics were low was because the nitrogen ratio was constant in the thickness direction of the active material layer. Because the expansion coefficient was constant in the entire active material layer, stress was easily applied to the interface between the active material layer and the current collector, so that the active material layer partially separated from the current collector.

EXAMPLE 2

(Battery 2)

A battery 2 was produced in the same manner as in EXAMPLE 1 except that propylene carbonate (PC) was used as a solvent for non-aqueous electrolyte. The non-aqueous electrolyte used here was prepared by dissolving $LiPF_6$ in a solvent mixture of PC and EMC at a volume ratio of 1:3 at a $LiPF_6$ concentration of 1 mol/L.

(Comparative Battery 4)

A comparative battery 4 was produced in the same manner as the comparative battery 2 was produced except that the same non-aqueous electrolyte as used in the battery 2 was used.

[Evaluation 2]

The initial capacities of the battery 2 and the comparative battery 4 were determined in the same manner as in EXAMPLE 1. The results are shown in Table 2.

TABLE 2

|  | Initial capacity (mAh) |
| --- | --- |
| Battery 2 | 210 |
| Comp. Battery 4 | Unable to measure |

In the comparative battery 4 whose non-aqueous electrolyte contained PC, a large amount of gas was generated at the initial charge. For this reason, discharge was impossible to perform. This is because a film was not formed on the graphite surface during decomposition of PC on the surface of graphite contained in the negative electrode as a conductive material, so that PC was kept decomposed. As a result, normal charge reaction did not proceed. In the comparative battery 2 whose non-aqueous electrolyte contained EC, a film composed of a decomposition product of EC was formed during decomposition of EC at the initial charge, so that EC was not decomposed in the subsequent cycles, and normal charge reaction took place.

As for the battery 2, because the negative electrode active material layer had excellent conductivity, unlike the comparative battery 4, the battery 2 did not have to contain a conductive material. Therefore, it can be concluded that the use of non-aqueous electrolyte containing PC does not cause any problem.

EXAMPLE 3

In this example, the distribution of nitrogen in the active material layer was varied by changing the flow rate of the ammonia gas introduced into the vacuum chamber.

(Battery 3)

A battery 3 was produced in the same manner as in EXAMPLE 1 except that the flow rate of the ammonia gas introduced into the vacuum chamber was set at 5 sccm.

(Battery 4)

A battery 4 was produced in the same manner as in EXAMPLE 1 except that the flow rate of the ammonia gas introduced into the vacuum chamber was set at 20 sccm.

(Battery 5)

A battery 5 was produced in the same manner as in EXAMPLE 1 except that the flow rate of the ammonia gas introduced into the vacuum chamber was set at 2 sccm, that the emission of the electron beam was set at 350 mA, and that the copper foil was moved at a rate of 15 cm/min.

(Battery 6)

A battery 6 was produced in the same manner as in EXAMPLE 1 except that the flow rate of the ammonia gas introduced into the vacuum chamber was set at 20 sccm, that the emission of the electron beam was set at 250 mA, and that the copper foil was moved at a rate of 2 cm/min.

In the batteries 3 to 6 produced here, the active material layer formed on each surface of the current collector had a thickness of 7 μm.

The negative electrodes included in the batteries 3 to 6 were analyzed by Auger electron spectroscopy (AES). Based on the presence ratio of silicon atom and nitrogen atom, the nitrogen ratio (i.e., molar ratio x of nitrogen atom to silicon atom) was calculated. In this example, a nitrogen ratio xa and a nitrogen ratio xb were determined. As used herein, the "nitrogen ratio xa" is the average nitrogen ratio in the area having a thickness of T/10 from the surface of the active material layer (i.e., from the second face not in contact with the current collector). Likewise, the "nitrogen ratio xb" is the average nitrogen ratio in the area having a thickness of T/10 from the interface between the current collector and the active material layer (i.e., from the first face in contact with the current collector).

[Evaluation 3]

The batteries 3 to 6 were analyzed for initial capacity, high rate capacity ratio and capacity retention rate in the same manner as in EXAMPLE 1. The results are shown in Table 3.

TABLE 3

|  | Nitrogen ratio xa | Nitrogen ratio xb | Initial capacity (mAh) | High rate capacity ratio (%) | Capacity retention rate at 100th cycle (%) |
| --- | --- | --- | --- | --- | --- |
| Battery 1 | 0.1 | 0.5 | 212 | 91 | 85 |
| Battery 3 | 0.05 | 0.2 | 221 | 81 | 80 |
| Battery 4 | 0.2 | 1.0 | 191 | 93 | 88 |
| Battery 5 | 0 | 0.1 | 223 | 72 | 76 |
| Battery 6 | 0.3 | 1.2 | 150 | 98 | 95 |

As is clear from Table 3, as a whole, as the amount of nitrogen in the active material layer increases, the high rate capacity ratio and cycle characteristics improve. The initial capacity, however, tends to decrease. The reason why as the amount of nitrogen in the active material layer increases, the high rate capacity ratio improves is because lithium ion conductivity becomes higher. Similarly, the reason why as the amount of nitrogen in the active material layer increases, the cycle characteristics improve is because the expansion coefficient of the active material decreases, preventing the active material from cracking and from separating from the current collector. The reason why as the amount of nitrogen in the active material layer increases, the initial capacity decreases is because when the nitrogen ratio is high, the amount of silicon reactive with lithium decreases.

Excellent balance among initial capacity, high rate capacity ratio and capacity retention rate was obtained when the nitrogen ratio xa in the vicinity of the active material layer surface satisfied $0 \leq xa \leq 0.2$, and the nitrogen ratio xb in the vicinity of the interface between the current collector and the active material layer satisfied 0.2≦xb≦1.0.

EXAMPLE 4

In this example, the thickness of the active material layer was varied by changing the rate at which the current collector was moved.

(Battery 7)

A negative electrode was produced in the same manner as in EXAMPLE 1 except that the emission of the electron beam was set at 250 mA, and that the copper foil was moved at a rate of 25 cm/min. The negative electrode active material formed on each surface of the current collector had a thickness of 0.5 μm. A battery 7 was produced in the same manner as in EXAMPLE 1 except that the negative electrode produced above was used, and that the thickness of the positive electrode was changed to ⅛ times that of the positive electrode of EXAMPLE 1.

(Battery 8)

A negative electrode was produced in the same manner as in EXAMPLE 1 except that the copper foil was moved at a rate of 2 cm/min. The negative electrode active material formed on each surface of the current collector had a thickness of 20 μm. A battery 8 was produced in the same manner as in EXAMPLE 1 except that the negative electrode produced above was used, and that the thickness of the positive electrode was changed to 1.2 times that of the positive electrode of EXAMPLE 1.

(Battery 9)

A negative electrode was produced in the same manner as in EXAMPLE 1 except that the copper foil was moved at a rate of 1.6 μm/min. The negative electrode active material formed on each surface of the current collector had a thickness of 30 μm. A battery 9 was produced in the same manner as in EXAMPLE 1 except that the negative electrode produced above was used, and that the thickness of the positive electrode was changed to 1.5 times that of the positive electrode of EXAMPLE 1.

(Battery 10)

A negative electrode was produced in the same manner as in EXAMPLE 1 except that the copper foil was moved at a rate of 1.4 cm/min. The negative electrode active material formed on each surface of the current collector had a thickness of 35 μm. A battery 10 was produced in the same manner as in EXAMPLE 1 except that the negative electrode produced above was used, and that the thickness of the positive electrode was changed to twice that of the positive electrode of EXAMPLE 1.

Because the negative electrodes of the batteries 7 to 10 had different thicknesses, the thickness of the positive electrode was changed in the batteries 7 to 10, so as to allow the batteries 7 to 10 to have a ratio between the positive electrode capacity and the negative electrode capacity closer to the ratio as originally designed, and to evaluate the high rate discharge characteristics and cycle characteristics of the batteries 7 to 10.

[Evaluation 4]

The batteries 7 to 10 were analyzed for initial capacity, high rate capacity ratio and capacity retention rate in the same manner as in EXAMPLE 1. The results are shown in Table 4. As the thickness of the active material is reduced, the initial capacity decreases accordingly. For this reason, the initial capacities are also shown in Table 4 for reference purposes.

TABLE 4

| | Initial capacity (mAh) | High rate capacity ratio (%) | Capacity retention rate at 100th cycle (%) |
|---|---|---|---|
| Battery 7 | 90 | 98 | 89 |
| Battery 8 | 275 | 82 | 79 |
| Battery 9 | 306 | 75 | 71 |
| Battery 10 | 385 | 70 | 65 |

The above result indicates that as the thickness of the active material layer was increased, the high rate discharge characteristics and cycle characteristics decreased. Presumably, this is because, as the thickness of the active material layer was increased, the volume thereof expanded and contracted to a greater extent during charge/discharge, resulting in low current collecting efficiency. A preferred thickness of the negative electrode active material layer was 30 μm or less. Although it is possible to form a negative electrode active material layer having a thickness of less than 0.5 μm by setting the moving speed of the current collector to not less than 25 cm/min., in this case, the positive electrode to be disposed opposite to the negative electrode needs to have a reduced thickness. Such a thin positive electrode cannot be produced by the method of EXAMPLE 1. Furthermore, the battery capacity decreases significantly, so that the advantage of high capacity offered by the use of silicon cannot be obtained. However, the negative electrode active material layer having a thickness of less than 0.5 μm is also advantageous when the thickness of the battery needs to be reduced.

In the case of the battery 7 whose negative electrode active material layer had a thickness of 0.5 μm, its capacity was low, but it was found to be promising as a battery capable of offering high power because it exhibited extremely good high rate capacity ratio. Because the batteries 7 to 10 in this example had the negative electrode current collectors of equal thickness, when the active material layer on one surface had a thickness of 0.5 μm, the current collector became excessively thicker relative to the active material layer. Accordingly, the volume of the active material layer that can be inserted into the battery case was reduced, and therefore the capacity decreased.

EXAMPLE 5

In this example, the means for forming the active material layer was changed.

(Battery 11)

A battery 11 was produced in the same manner as in EXAMPLE 1 except for the following.

Instead of the ammonia gas, a nitrogen gas having a purity of 99.7% (available from Nippon Sanso Corporation) was introduced from the nozzle 26 at a flow rate 20 sccm. The nitrogen gas was converted into a plasma by the electron beam irradiation device 27 arranged near the nozzle 26 with an accelerating voltage of −4 kV and an emission of 20 mA. At the same time, the accelerating voltage of the electron beam irradiated to the targets 25a and 25b, each comprising a silicon single crystal, was set at −8 kV, and the emission was set at 300 mA. The copper foil was moved at a rate of 7 cm/min.

(Battery 12)

A battery 12 was produced in the same manner as in EXAMPLE 1 except for the following.

Silicon nitride was used as the target 25a, and a silicon single crystal was used as the target 25b. The accelerating voltage of the electron beam irradiated to the target 25a was set at −8 kV, and the emission was set at 300 mA. No ammonia gas or nitrogen gas was introduced into the vacuum chamber. The accelerating voltage of the electron beam irradiated to the target 25b was set at −8 kV, and the emission was set at 300 mA. The copper foil was moved at a rate of 7 cm/min.

In this battery, an active material composed mainly of silicon nitride was formed on the current collector at the start of the deposition. As the thickness of the active material layer increased, an active material having a high silicon content was deposited gradually. At the end of the deposition, silicon was deposited.

(Battery 13)

A negative electrode was produced using a sputtering apparatus (available from ULVAC, Inc.) as shown in FIG. 3.

As the negative electrode current collector, an electrolytic copper foil (available from Furukawa Circuit Foil Co., Ltd.) having a width of 10 cm, a thickness of 35 μm and a length of 50 m was used. As targets 35a and 35b, silicon single crystals having a purity of 99.9999% (available from Shin-Etsu Chemical Co., Ltd.) were used.

As the nitrogen-containing gas, a nitrogen gas having a purity of 99.7% (available from Nippon Sanso Corporation) was used. The nitrogen gas was ejected from a nozzle 36 into a vacuum chamber 30 at a flow rate of 1 sccm. The nozzle 36 was connected to a pipe inserted in the vacuum chamber 30 which was connected to a bomb filled with the nitrogen gas through a mass flow controller.

A hooped copper foil current collector 31 was attached to a feeding roller 32. The current collector 31 was conveyed through a roller 38, a can roller 33 and another roller 39 to a winding roller 34 having an empty reel where the current collector 31 was wound. The current collector 31 was moved at a rate of 0.1 cm/min. The can roller 33 had a surface temperature of 25° C.

As the sputtering gas, an argon gas having a purity of 99.999% (available from Nippon Sanso Corporation) was used. The flow rate of the argon gas was set at 100 sccm. The pressure in the vacuum chamber was set at 1 Torr.

The targets 35a and 35b were sputtered by a high frequency power supplier 303 with an output power of 2 kW to vaporize silicon atoms. The silicon atoms passed through the nitrogen atmosphere were deposited along with nitrogen on one surface of the current collector, forming an active material layer.

Subsequently, in the same manner as described above, an active material layer composed of silicon and nitrogen was also formed on the other surface of the current collector. The active material layer on each surface of the current collector had a thickness of 6 μm.

The obtained active material layers were analyzed by Auger electron spectroscopy (AES). As a result, it was confirmed that the distribution of silicon and nitrogen in the thickness direction was almost the same as that of the negative electrode of the battery 1.

A battery 13 was produced in the same manner as in EXAMPLE 1 except that the negative electrode produced above was used.

(Battery 14)

A first active material layer was formed on one surface of a copper foil in the same manner as in EXAMPLE 1 except for the following. The ammonia gas was supplied uniformly to a vicinity of the targets at a flow rate of 15 sccm. The copper foil was moved at a rate of 14 cm/min. The emission of the electron beam was set at 300 mA.

Subsequently, a second active material layer was formed on the first active material layer by reversing the direction of rotation of the motor so as to allow the copper foil to move in the opposite direction from the winding roller 24 to the feeding roller 22. The flow rate of the ammonia gas was set at 5 sccm.

In the same manner as above, another first and second active material layers composed of silicon and nitrogen were formed on the other surface of the copper foil.

The first active material layer had a thickness of 2 μm, and the second active material layer had a thickness of 5 μm. The total thickness of the first and second active material layers formed on one surface was 7 μm.

AES analysis showed that the first and second active material layers had constant nitrogen ratios in the thickness direction thereof. The first active material layer had a nitrogen ratio of about 0.5, and the second active material layer had a nitrogen ratio of about 0.1. The nitrogen ratio changed abruptly at the interface between the first and second active material layers. The change of the nitrogen ratio was discontinuous.

A battery 14 was produced in the same manner as in EXAMPLE 1 except that the negative electrode produced above was used.

[Evaluation 5]

The batteries 11 to 14 were analyzed for initial capacity, high rate capacity ratio and capacity retention rate in the same manner as in EXAMPLE 1. The results are shown in Table 5.

TABLE 5

|  | Initial capacity (mAh) | High rate capacity ratio (%) | Capacity retention rate at 100th cycle (%) |
| --- | --- | --- | --- |
| Battery 11 | 220 | 87 | 84 |
| Battery 12 | 216 | 90 | 86 |
| Battery 13 | 215 | 88 | 80 |
| Battery 14 | 205 | 80 | 71 |

A comparison between the result of the battery 11 and that of the battery 1 shows that they exhibited similar values except for initial capacity. In other words, this shows that the use of nitrogen gas, instead of ammonia gas, also yields the active material layer of the present invention. This is because the conversion of the nitrogen gas into a plasma improved the reactivity between silicon and nitrogen.

The result of the battery 12 shows the combined use of a silicon target and a silicon nitride target is also advantageous.

A comparison between the result of the battery 1 and that of the battery 13 shows that the negative electrodes of similar performance were obtained regardless of the use of the vapor deposition apparatus or sputtering apparatus.

The result of the battery 14 shows that even when the nitrogen ratio changed discontinuously in the thickness direction of the active material layer, the high rate discharge characteristics and the cycle characteristics were improved. The battery 14, however, was slightly poorer in characteristics than the battery 1 as a whole, as shown by comparison of the battery 14 with the battery 1. This is presumably because expansion stress focused on the interface between the first and second active material layers, causing a crack or chip, reducing the lithium ion conductivity and electron conductivity. Accordingly, the nitrogen ratio is preferably varied continuously in the thickness direction of the active material layer.

As described above, according to the present invention, it is possible to provide a negative electrode for a high capacity lithium ion secondary battery having excellent high rate discharge characteristics and superior cycle characteristics.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A negative electrode for a lithium ion secondary battery comprising a current collector and an active material layer carried on said current collector,
   wherein said active material layer comprises an active material and no binder, said active material comprising silicon and nitrogen,
   said active material layer has a larger nitrogen ratio on a side of a first face which is in contact with said current collector than on a side of a second face which is not in contact with said current collector, and
   said nitrogen ratio is continuously increased from said second face to said first face.

2. A negative electrode for a lithium ion secondary battery comprising a current collector and an active material layer carried on said current collector,
   wherein said active material layer comprises an active material and no binder, said active material comprising silicon and nitrogen,
   said active material layer has a larger nitrogen ratio on a side of a first face which is in contact with said current collector than on a side of a second face which is not in contact with said current collector, and
   a region having a thickness of T/10 from said second face, where T represents a thickness of said active material layer, has a composition represented by $SiN_x$ where $0 \leq x \leq 0.2$.

3. A negative electrode for a lithium ion secondary battery comprising a current collector and an active material layer carried on said current collector,
   wherein said active material layer comprises an active material and no binder, said active material comprising silicon and nitrogen,
   said active material layer has a larger nitrogen ratio on a side of a first face which is in contact with said current collector than on a side of a second face which is not in contact with said current collector, and
   a region having a thickness of T/10 from said first face, where T represents a thickness of said active material layer, has a composition represented by $SiN_x$ where $0.2 < x \leq 1$.

4. The negative electrode for a lithium ion secondary battery in accordance with claim 1,
   wherein said active material layer has a thickness T of 0.5 to 30 μm.

5. A lithium ion secondary battery comprising a positive electrode, the negative electrode in accordance with claim 1, and an electrolyte interposed between said positive electrode and said negative electrode.

6. The negative electrode for a lithium ion secondary battery in accordance with claim 2,
   wherein said active material layer has a thickness T of 0.5 to 30 μm.

7. The negative electrode for a lithium ion secondary battery in accordance with claim 3,
   wherein said active material layer has a thickness T of 0.5 to 30 μm.

8. A lithium ion secondary battery comprising a positive electrode, the negative electrode in accordance with claim 2, and an electrolyte interposed between said positive electrode and said negative electrode.

9. A lithium ion secondary battery comprising a positive electrode, the negative electrode in accordance with claim 3, and an electrolyte interposed between said positive electrode and said negative electrode.

* * * * *